Aug. 17, 1954     F. W. MOORE     2,686,392
BELT SANDER
Filed Dec. 3, 1951     3 Sheets-Sheet 1
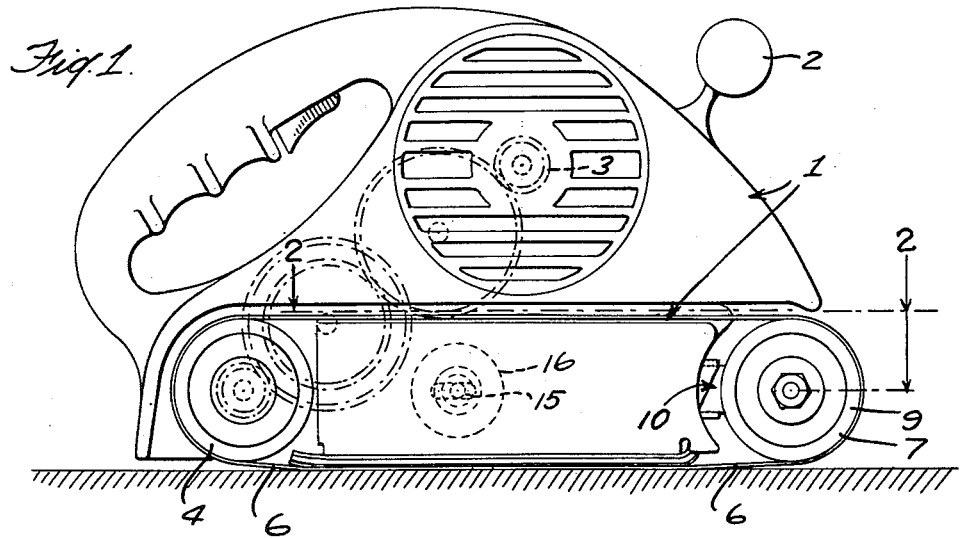
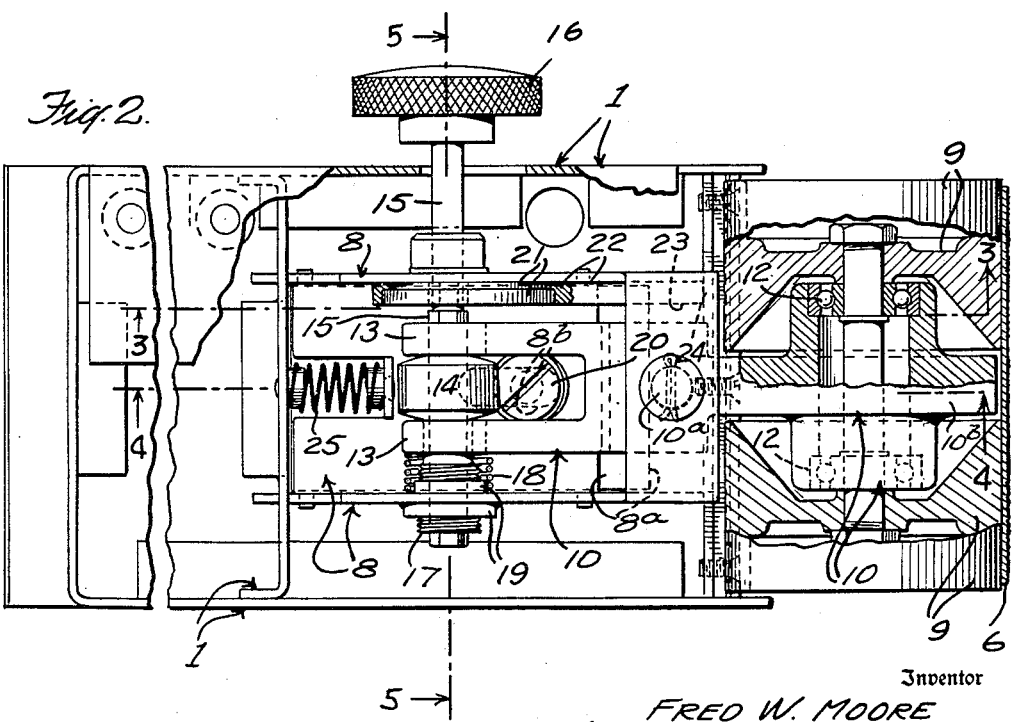
Inventor
FRED W. MOORE Aug. 17, 1954 F. W. MOORE 2,686,392
BELT SANDER
Filed Dec. 3, 1951 3 Sheets-Sheet 2
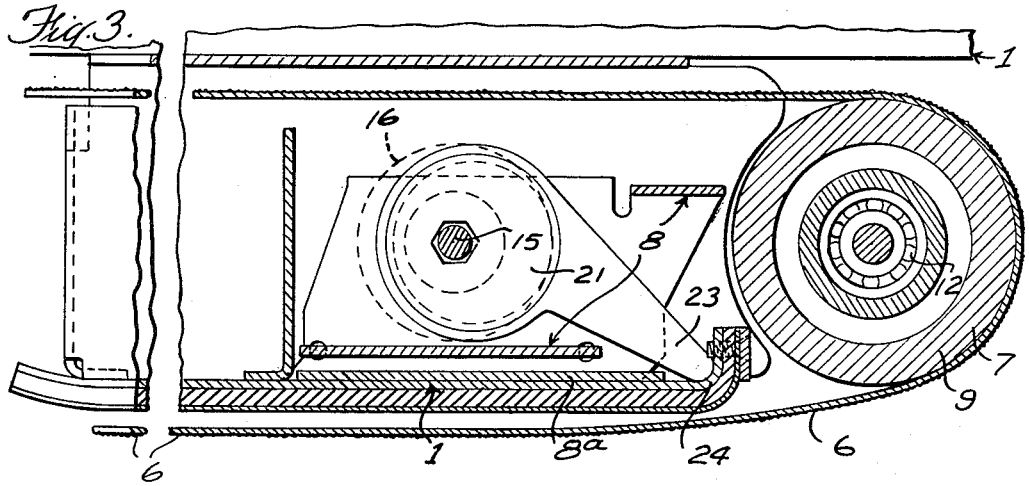
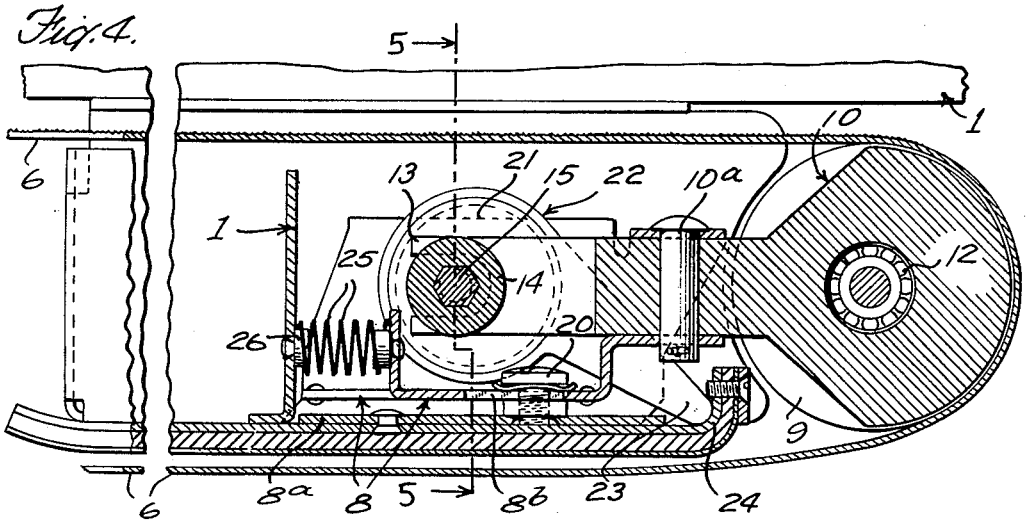
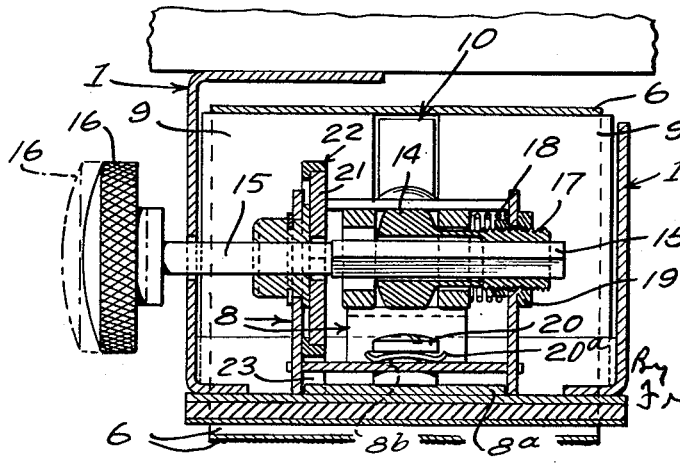
Inventor
FRED W. MOORE
Attorney Aug. 17, 1954  F. W. MOORE  2,686,392
BELT SANDER
Filed Dec. 3, 1951  3 Sheets-Sheet 3
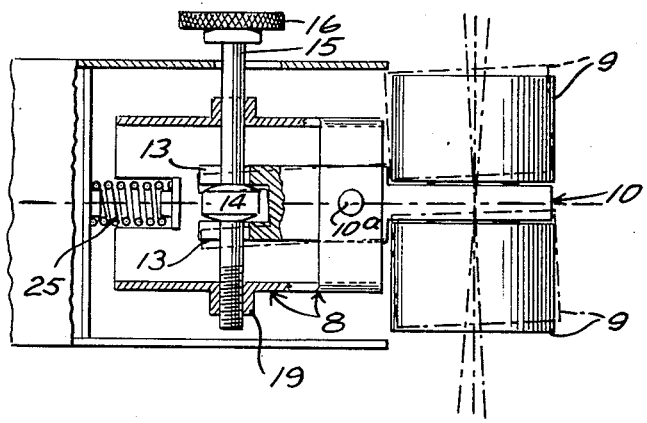
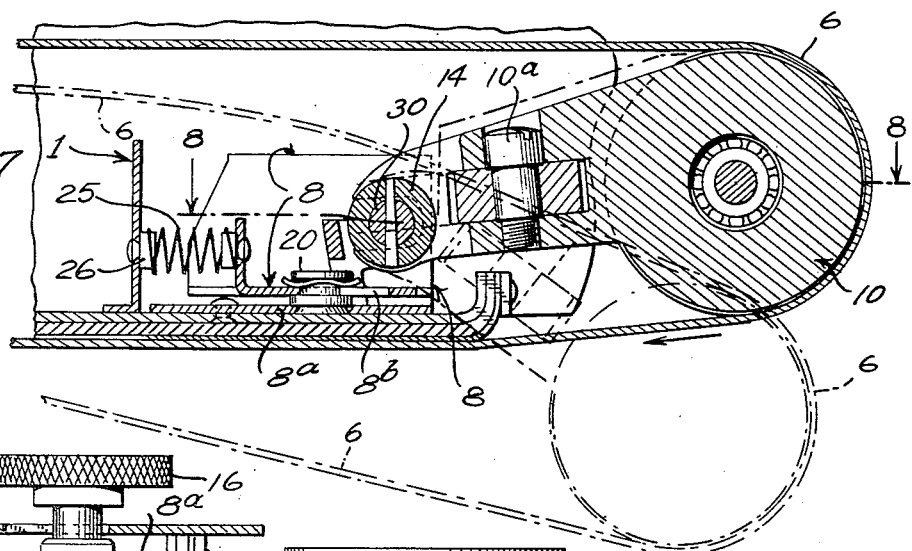
Inventor
FRED W. MOORE
By Frederick P Cooper
Attorney Patented Aug. 17, 1954

2,686,392

UNITED STATES PATENT OFFICE 2,686,392

BELT SANDER

Fred Williams Moore, Greenfield, Mass., assignor to Millers Falls Company, Greenfield, Mass., a corporation of Massachusetts Application December 3, 1951, Serial No. 259,579

3 Claims. (Cl. 51—170)

This invention relates to belt sanders.

An object is to provide an efficient means for tracking a belt, that is, when the belt shifts from one side to the other of the guiding rolls, bringing it back to the correct straight line movement.

A further object is the provision of means whereby the idler roll at the front end of the belt may be adjusted to the proper tension position for driving the belt, and may also be retracted to a position to free the belt and permit its ready removal and replacement.

A further object is the provision of means whereby the tracking and tensioning of the belt may be conveniently accomplished by hand wheel carried at the side of the machine on the end of a shaft passing through the machine, so that by turning said shaft or by moving it in and out of the machine, the various functions of tensioning and tracking the belt may be readily and quickly performed.

Other objects of the invention will in part be obvious and will in part appear hereinafter.

The invention accordingly comprises the features of construction, combinations of elements and arrangement of parts which will be exemplified in the constructions hereinafter set forth and the scope of the application of which will be indicated in the claims.

For a fuller understanding of the nature and objects of the invention, reference should be had to the following detailed description taken in connection with the accompanying drawings, in which—

Figure 1 is a side elevation of the machine on a reduced scale belt at proper tension for the sanding operation.

Figure 2 is a section taken on the line 2—2 of Figure 1 looking in the direction of the arrows.

Figure 3 is a section on the line 3—3 of Figure 2 showing the position of the idler roll with the belt slackened by an eccentric, in position to facilitate replacement of the belt.

Figure 4 is a similar view taken on line 4—4 of Figure 2 with further details of the carriage upon which the idler roll is mounted.

Figure 5 is a section on the line 5—5 of Figures 2 and 4 looking in the direction of the arrows.

Figure 6 is a fragmentary view showing the means for accomplishing the tracking operations with other parts omitted for clearness.

Figure 7 shows a modification in which the movement of the idler roll to another position for releasing the tension upon the belt and replacement of same is provided by pivoting said idler roll so that it may be moved downwardly as indicated by the dotted lines.

Figure 8 is a view taken on line 8—8 of Figure 7 showing details of the connection between the control shaft and the two part idler roll.

As shown the frame 1, having a hand grip 2, carrries a gear 3, driven by the armature of an electric motor of conventional form, the housing of which is shown, and which through the train of gears shown, drives the driving wheel 4. The sanding belt 6, passes around this driving wheel and a forward idler wheel 7. The forward idler wheel is carried at the forward end of a carriage 8, mounted for reciprocal movement toward and away from the driving wheel within the frame 1.

Considering first the tracking means, the idler wheel 7 is divided into two sections 9 and 9 and is carried by the arm 10 pivotally mounted at 10ª upon the carriage 8.

As shown at the right hand end of Figure 2 an extension 10ᵇ of the arm 10 provides hubs for the two parts of the divided roll with anti-friction bearings 12.

The inner end of the arm 10 is forked as shown in Figure 2 and the forks 13 and 13 extend on each side of a head 14 and also straddle the controller shaft 15. The hand wheel 16 is for rotating the shaft 15 or moving it in and out with reference to the frame and the carriage 8, which is mounted to reciprocate within the frame 1. As shown the inner part of the controller shaft 15 is hexagonal so that when it turns it carries with it the outer end 17 of the part which carries at its inner end of the head 14. Spring 18 interposed between one of the fork legs 13 and the carriage frame 8 gives a spring tension for the parts. When the threaded end 17 is rotated by the controller shaft 15 it screws in and out of the carriage frame through a threaded collar 19 secured on the carriage frame, therefore head 14 coacting with the internally threaded collar 19 will cause the forked members 13—13 to pivot the arm 10 and the divided rolls carried thereon, compensating for any tracking of the belt.

Referring now to the carriage 8 and the means for adjusting its position, for tensioning and relieving the tension upon the belt 6.

The carriage 8 is mounted to reciprocate upon the frame 1 and is provided with a clearance slot 8ᵇ through which as shown a screw pin 20 passes down through the carriage into the track plate 8ª and main frame with a flat spring 20ª for cushioning the movement of the carriage as it is moved. The plate 8ª also serves as a track to guide the carriage 8.

An eccentric 21 is mounted on an eccentric follower 22 which is provided with an arm 23 extending forwardly and downwardly to contact the main frame at 24 as shown in Figure 3. As shown in Figure 5 when the controller shaft 15 is in a full line position as shown the eccentric 21 is free of the controller shaft. However, when this controller shaft is moved outwardly to the dotted line position as shown, its hexagonal portion passes into a corresponding hexagon in the eccentric and when the shaft is turned the eccentric will turn therewith.

A compression spring 25 mounted between a part of the main frame 1 at 26 and a part of the carriage frame 8 tends to urge the carriage to the right as shown in Figures 2, 3 and 4 and thereby to move the idler wheel carried with the carriage to a tensioning position with respect to the belt 6.

With the parts shown in the dotted line position in Figure 5, when controller shaft is turned either clockwise or counter-clockwise the eccentric 21 will move to the left and cause a relative movement of the carriage to the left, against the spring 25, as best shown in Figures 3 and 4. When the carriage is in its extreme left position as shown in Figures 3 and 4, the belt is loose enough to be removed.

Figure 7 shows a modification of the means for removing the belt tension for renewal and replacement of the same. The idler roll 7 is shown as pivoted at 30 to the carriage frame so that it may be manually moved downward to the position shown on dotted lines whereupon the tension on the belt is slackened for removal. The spring 25 as shown in this Figure 7 operates as before.

It will thus be seen that I have here provided a machine which readily and quickly accomplishes the objects set forth above by the mere turning or pulling in and out of a controller shaft.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

I claim:

1. In a belt sander, in combination, a frame, a power driven roll mounted at one end of said frame, a carriage reciprocably mounted on said frame, an idler roll carried by said carriage in line with said driven roll, an arm carrying said idler roll, pivotally mounted on said carriage, a control shaft extending across said carriage, a connection between said control shaft and the idler carrying arm for moving said arm upon its pivot, and a connection between said control shaft and said carriage for adjusting the idler roll to and away from said driven roll.

2. In a belt sander, in combination, a frame, a power driven roll mounted at one end of said frame, a carriage reciprocably mounted on said frame, an idler roll carried by said carriage in line with said driven roll, a control shaft extending across said carriage and mounted for rotation and for in-and-out movement with respect thereto, a spring mounted between said frame and said carriage to urge said carriage away from said driven roll, an eccentric carried by said carriage, means at one in-and-out position of the control shaft for connecting said eccentric to turn with said control shaft and thus permit the movement of said carriage to a fully extended position under the action of said spring in one direction and to a retracted position against the action of said spring in the other direction.

3. In a belt sander, in combination, a frame, a power driven roll mounted at one end of said frame, a carriage reciprocably mounted on said frame, an idler roll carried by said carriage in line with said driven roll, an arm carrying said idler roll pivotally mounted on said carriage, a control shaft extending across said carriage mounted for rotation and for in-and-out movement with respect thereto, a connection between said control shaft and said idler roll arm to turn said arm on its pivot upon rotation of said control shaft, a spring mounted between said frame and said carriage to urge said carriage away from said driven roll, an eccentric carried by said carriage, means at one in-and-out position of the control shaft for connecting said eccentric to turn with said control shaft and thus permit the movement of said carriage to a fully extended position under the action of said spring in one direction and to a retracted position against the action of said spring in the other direction.

References Cited in the file of this patent

UNITED STATES PATENTS

| Number | Name | Date |
| --- | --- | --- |
| 1,821,624 | Emmons | Sept. 1, 1931 |
| 1,913,503 | Myers | June 13, 1933 |
| 1,913,574 | Vicic | June 13, 1933 |
| 1,920,364 | Degen | Aug. 1, 1933 |
| 1,939,111 | Emmons | Dec. 12, 1933 |
| 1,969,318 | Myers | Aug. 7, 1934 |
| 2,260,949 | Mall | Oct. 28, 1941 |
| 2,289,481 | Burleigh | July 14, 1942 |

FOREIGN PATENTS

| Number | Country | Date |
| --- | --- | --- |
| 945,719 | France | Dec. 6, 1948 |